United States Patent [19]

DeGraffenreid

[11] 4,320,005
[45] Mar. 16, 1982

[54] COALESCER OR FILTER END CAP

[76] Inventor: Howard T. DeGraffenreid, P.O. Box 261, Inola, Okla. 74036

[21] Appl. No.: 128,310

[22] Filed: Mar. 7, 1980

Related U.S. Application Data

[63] Continuation of Ser. No. 22,685, Mar. 21, 1979, abandoned.

[51] Int. Cl.³ .............................................. B01D 27/02
[52] U.S. Cl. ............................. 210/232; 210/DIG. 5
[58] Field of Search .............. 277/205, 184, 166, 235, 277/189; 285/331; 292/307 R; 210/440–445, 232, 450, DIG. 5; 55/502

[56] References Cited

U.S. PATENT DOCUMENTS

| | | | |
|---|---|---|---|
| 2,210,213 | 7/1940 | Long | 210/131 |
| 2,340,732 | 2/1944 | Bruno | 285/331 |
| 2,506,687 | 5/1950 | Scherrer | 285/331 |
| 2,587,903 | 3/1952 | Rood | 210/140 |
| 3,241,679 | 3/1966 | Walter | 210/444 |
| 3,556,300 | 1/1971 | Codo | 210/232 |
| 3,662,895 | 5/1972 | Tuffnell et al. | 210/439 |
| 3,880,757 | 4/1975 | Thomason | 210/167 |
| 4,057,502 | 11/1977 | Crumrine et al. | 277/184 |
| 4,065,392 | 12/1977 | Gammon | 210/282 |

*Primary Examiner*—Frank Sever
*Attorney, Agent, or Firm*—Albert L. Jeffers; John F. Hoffman

[57] ABSTRACT

A coalescer or filter cartridge end cap having a disc-like base portion adapted to support filter media or coalescing media, and a central opening therein through which the liquid to be passed through the filter or coalescer flows. A counterbore section coaxial with the center line of the end cap forms a downwardly depending skirt having a lower edge adapted to receive a gasket. The skirt extends sufficiently to permit the cartridge equipped with the end caps of the present invention to be fitted over a wide variety of cartridge mounting stools, which normally include a short annular upstanding extension perpendicular to the cartridge sealing surface. Additionally, the inner diameter of the skirt is dimensioned to allow for sufficient clearance between the inner diameter of the skirt and the outer diameter of the stool extension, and is sufficiently long to afford clearance space between the upper end of the stool extension and the bottom surface of the base portion. Preferably, the inner diameter of the opening of the end cap is less than the outer diameter of the mounting stool extension.

8 Claims, 5 Drawing Figures

COALESCER OR FILTER END CAP

This is a continuation of application Ser. No. 22,685 filed Mar. 21, 1979, now abandoned.

BACKGROUND OF THE INVENTION

The present invention relates to end caps for coalescer or filter cartridges.

Coalescers and filter cartridges are generally manufactured in cylindrical form and comprise a selected medium or media for the removal of undesirable contaminants. The media generally requires a structural member to support it, and the media must be sealed at the ends to prevent passage of fluid around the ends of the media rather than passing through it. Generally, some type of rigid disc-like member, having a bore or opening corresponding to the desired bore of the cartridge, is provided and the filter or coalescing medium or media is secured thereto. Such an end cap or disc may be molded of plastic or formed of metal and shaped as to form a reservoir which contains the adhesive for bonding the media and structural member to the end cap. It is common practice to attach a gasket to the end cap on the side opposite that to which the media is adhered so as to form a seal between the end cap of the cartridge and the stool on which the cartridge is mounted. Sometimes, the material used as the adhesive may be molded to form the end cap itself, thereby eliminating a separate end cap. In this case, the gasket is integral with the molded end cap.

Coalescer/filter cartridges have as a primary function the removal of solid contaminants and/or coalescing immiscible fluids one from another. The media by which the contaminant, either solid or liquid, is removed may take the form of a pleated surface, a surface of multiple pleats, a cylindrical surface, or a cylindrical mass of selected depth. These media prevent the passage of solids or liquid droplets, such as would be the case in a hydrophobic membrane, or permit the passage of the liquid but entrap the solid particles so as to prevent their passage through the medium or media. Coalescing media opposes the direct flow of a small liquid droplet and retains it within the medium until it has the opportunity to join with other similar droplets thereby forming larger droplets due to the cohesive action between one droplet and another. This formation of larger droplets, either due to impaction or compaction of one droplet against another, is the principle on which coalescence is based.

Coalescer/filter cartridges are generally made in cylindrical form and include end caps having an outside diameter and an inside diameter between which is the area to which the coalescing/filtering media or medium is attached. The dimension between the inner and outer diameters determines the amount of coalescer/filter medium or media which may be used in a given filter cartridge. Again, since the purpose of the media is to prevent the passage of undesirable contaminants, the ends of the media must be sealed to prevent the passage of fluid around them. Typically, this seal is accomplished by metal, plastic, or paper end caps or discs designed so as to form a shallow reservoir into which the adhesive is applied for the attachment of the coalescer/filter media to the impervious end cap. This end cap or disc accommodates the attachment of a gasket seal on the surface opposite that of the adhesive reservoir for adherence of the media to the end cap. A typical cartridge has an outer diameter of approximately six inches and an inner diameter of approximately three and one-half inches.

The central opening of the end cap and that of the cartridge is placed over the cartridge mounting stool upstanding extension, which has the purpose of positioning the cartridge so that the central axis for the cartridge coincides with the axis of the cartridge mounting stool. The cartridge mounting stool includes a surface orthogonal to the stool axis for the purpose of sealing against the cartridge gasket. Axial load is then applied to the end of the cartridge to provide a tight seal against the gasket. The integrity of this seal is important to insure that all fluid passes through the coalescing/filter medium.

A drawback to filter cartridges having end caps of this type is that the amount of filter or coalescing media is dictated by the inner and outer diameters of the end cap. To increase the area of pleated media or to increase the volume of depth type media, it is necessary to reduce the inside diameter of the end cap opening so that the media can be adequately supported and sealed on its ends. In the case of prior art end caps, however, a problem arises in reducing the inner diameter thereof because of the upstanding extension portion of the mounting stool, which extends through the end cap bore. With prior art end caps, the minimum inner diameter is limited to the outer diameter of the mounting stool extension, thereby limiting the amount of filtering or coalescing media contained within the cartridge.

SUMMARY OF THE INVENTION

The present invention permits the amount of coalescing and filtering media to be increased by enabling the inside diameter of the primary bore of the end cap to be reduced yet permitting mounting of the end cap on a standard cartridge mounting stool having a centering extension with an outer diameter larger than the inner diameter of the end cap primary bore. This is accomplished by providing a downwardly extending annular skirt, which may have a cylindrical outer configuration and either a cylindrical or tapering inner configuration, which fits around the upstanding centering extension of the mounting stool. Since the primary bore for the end cap is raised above the end of the mounting stool centering extension, the inner diameter of the primary bore may be varied to accommodate the amount of filtering or coalescing media desired without regard to the outer diameter of the mounting stool extension. Since filter cartridge end caps may be inexpensively produced and since it is a simple manufacturing matter to vary the diameters of their primary bores, filters and coalescers having a wide variety of capacities may be produced without major modifications to the cartridge design. Additionally, these cartridges may be installed on standard size cartridge mounting stools without the necessity for any modification whatsoever.

A further advantage to the end cap according to the present invention is that sealing between the end cap and mounting stool may more easily be effected by reducing the sealing surface area, thereby requiring a lower coaxial load to effect the seal. A similarly shaped end cap may be utilized on the opposite end of the cartridge for sealing against the head.

Specifically, the present invention relates to a coalescer or filter end cap comprising a disc-like base portion having an upper surface adapted for supporting filter or coalescing media and having an opening extending therethrough spaced radially inwardly of the peripheral edge of the base portion. A skirt connected to the base portion on the opposite side thereof relative to the upper surface extends generally downwardly away from the base portion and terminates in a lower edge adapted to receive a suitable gasket. The skirt includes a peripheral outer surface which may have a diameter smaller than the diameter of the peripheral edge of the base portion, and an inner surface opposite the outer peripheral surface defining a counterbore having a diameter larger than the diameter of the end cap opening.

DETAILED DESCRIPTION

Figures 1, 2, 5:
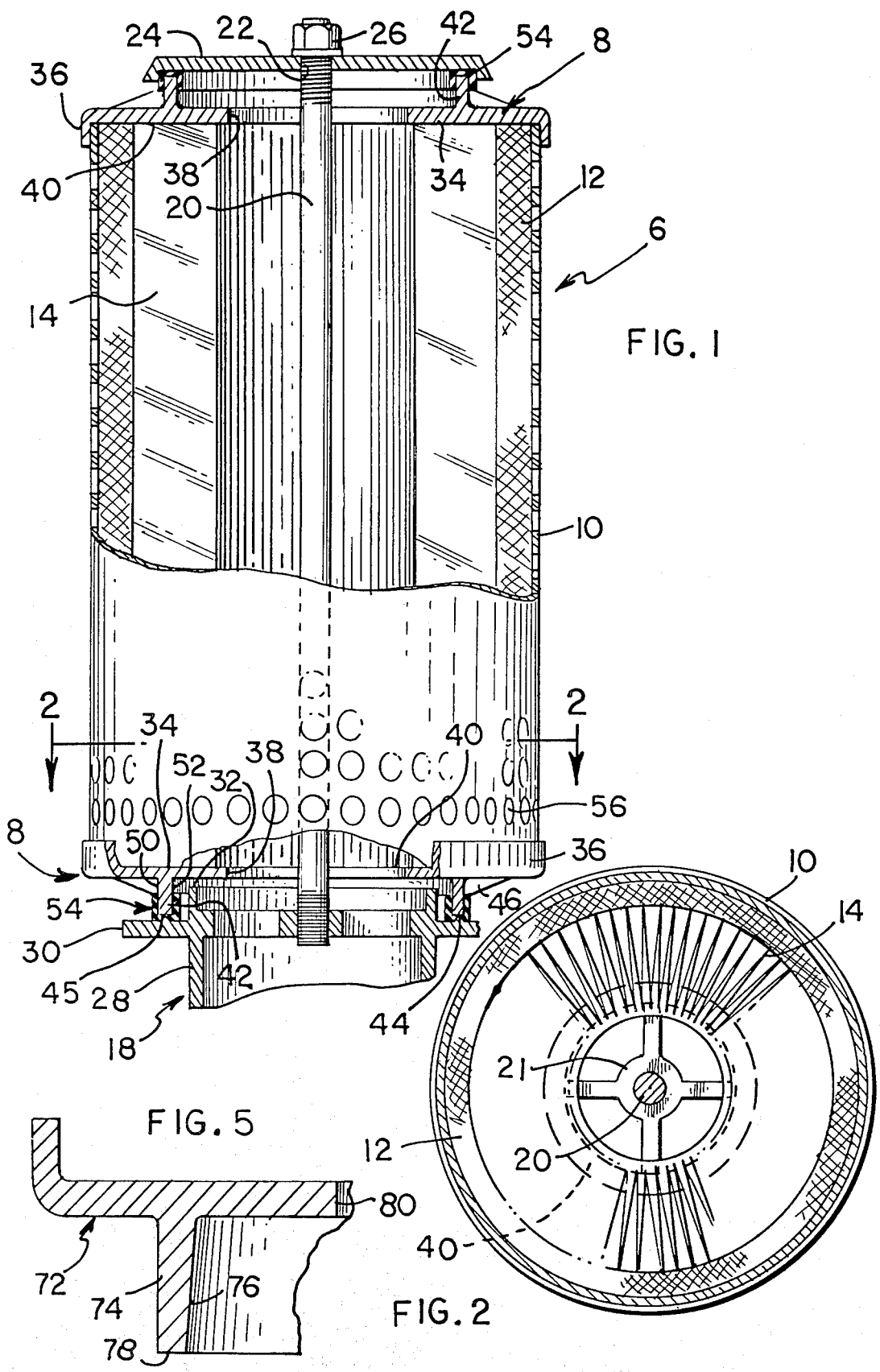
FIG. 1 is an elevational view partially in section showing end caps according to the present invention in combination with a filter coalescer cartridge, which is seated on a mounting stool.
FIG. 2 is a sectional view taken along line 2—2 of FIG. 1 and viewed in the direction of the arrows.
FIG. 5 is an enlarged, fragmentary, sectional view of a modified end cap in accordance with the present invention.

Referring now to the drawings and in particular to FIGS. 1 and 2, a filter/coalescer 6 having end caps 8 according to the present invention is shown. Cartridge 6 comprises an outer foraminous cylindrical shell 10, which is open on its upper and lower ends, a cylindrical outer shell of coalescing media 12, and an inner cylindrical unit of pleated filter media 14. End caps 8 are disposed over opposite ends of shell 10 and media 12 and 14, and cartridge 6 is secured to mounting stool 18 by means of a threaded rod 20. Rod 20 is threadedly secured to spider 21, which forms a part of mounting stool 18, and extends through an opening 22 in head 24, head 24 being secured to rod 20 by means of nut 26.

Mounting stool 18 comprises a tubular portion 28, which is connected to the source of incoming liquid, a flange 30 having an annular ridge 45, and an upstanding centering extension 32, which extends up into end cap 8. End caps 8 each comprise a disc-like base portion 34 having a lip portion 36 and a primary bore or opening 38, which is concentric with the outer peripheral edge defined by lip 36. Integral with and extending from the opposite side of base portion 30 from the filter/coalescing media supporting surface 40 is a cylindrical skirt 42. Skirt 42 terminates at a surface 44, which preferably is flat and lies within a single plane. Integral radial ribs 46 extending between base portion 34 and skirt 42 provide additional support and rigidity for the end caps 8. Skirt 42 has a peripheral outer surface 50 and a cylindrical inner surface 52, the latter having a diameter greater than the diameter of primary bore 38 so as to form a counterbore with respect thereto. It will be noted that the outer surface 50 of skirt 42 may have a diameter less than the outer diameter of base portion 34.

The outer configuration of base portion 36 is preferably circular, as is primary bore 38. End caps 8 may be made of metal paper or plastic, depending on the environment in which they will be used. Outer coalescer shell 12 and inner pleated filter media 14 are preferably adhesively secured to the inwardly facing surfaces 40 of end caps 8 in a manner well known in the art.

Figure 4:
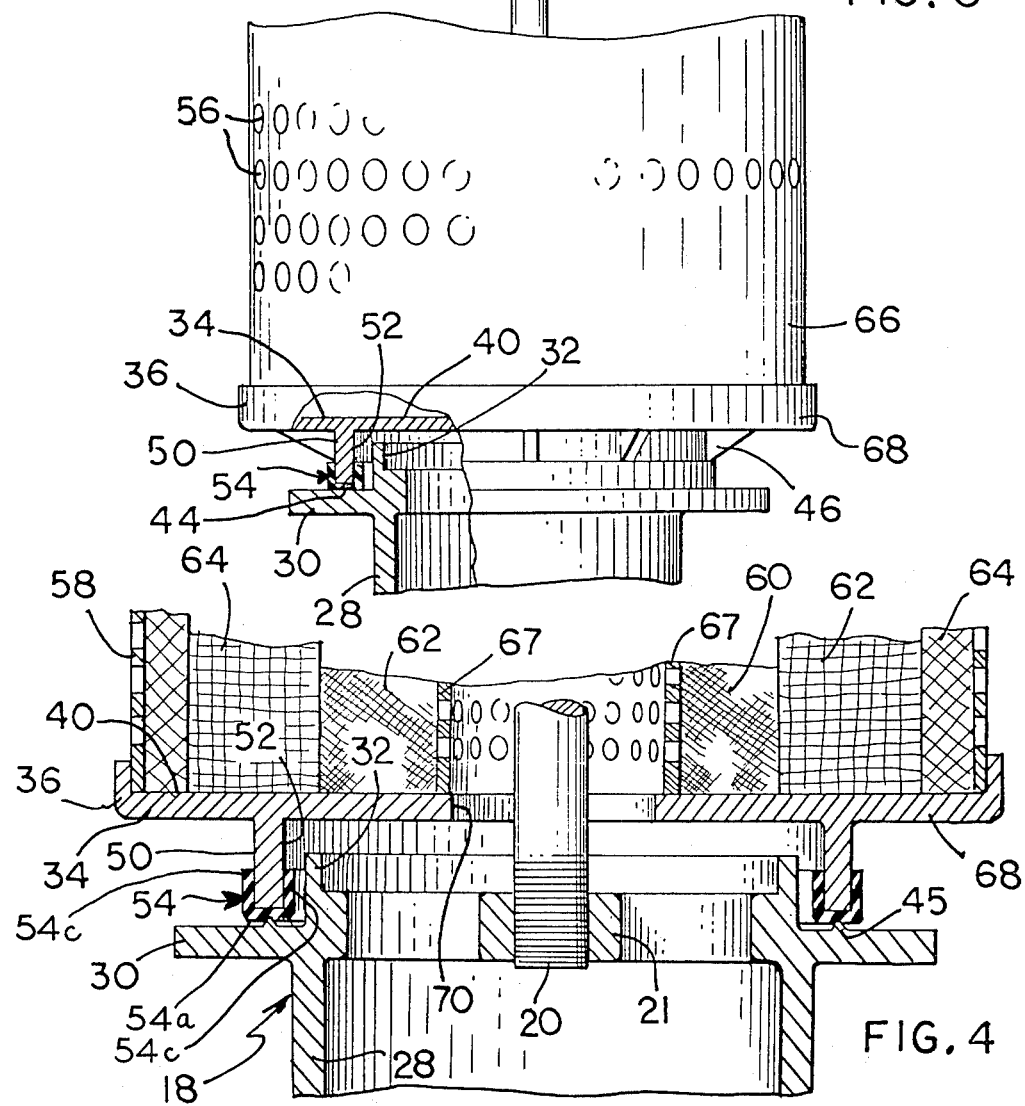
FIG. 4 is an enlarged, fragmentary, sectional view of the cartridge and mounting stool shown in FIG. 3.

Seated over and preferably adhesively secured to the skirt 42 of each of the end caps 8 is an annular, U-shaped resilient plastic gasket 54, which is for the purpose of sealing end caps 8 against mounting stool 18 and head 24, respectively. Gasket 54 includes bottom portion 54a on the skirt lower surface 44 and sides 54b and 54c extending upwardly along the skirt inner surface 52 and outer surface 50, respectively, (FIG. 4). As nut 26 is tightened down against head 24, end caps 8 and outer shell 10 will be clamped together and clamped against the flange 30 of mounting stool 18. This will compress gaskets 54 between end caps 8 and head 24 and flange 30, respectively, thereby providing a fluid-tight seal. Ridge 45 penetrates gasket 54 as shown in FIG. 4.

In use, the liquid to pass through the filter or coalescer 6 flows upwardly through tubular portion 28, upstanding extension 32, and primary bore 36 whereupon it flows outwardly through filter media 14 and coalescing media 12 through the openings 56 in outer shell 10. A filter cartridge of this type may be disposed within an oil or gasoline reservoir tank (not shown) of a filtering system.

Figure 3:
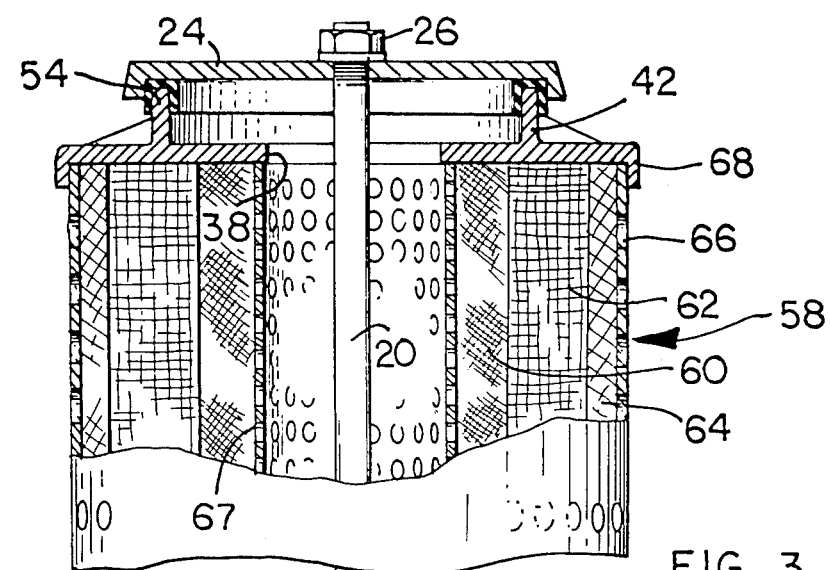
FIG. 3 is an elevational view, partially in section, of a filter cartridge seated on a mounting stool and including end caps according to the present invention.

By virtue of the design of end caps 8, filter cartridge 10 may be utilized for filters or coalescers having a greater amount of filtering or coalescing media simply by reducing the diameter of primary bore 38. An example of such modification is shown in FIGS. 3 and 4 wherein filter cartridge 58 comprises a plurality of filter media 60, 62 and 64, which together have a greater radial thickness than the media 12 and 14 of the cartridge 6 shown in FIGS. 1 and 2. Cartridge 58, which includes an outer foraminous shell 66 and an inner foraminous shell 67 is provided with end caps 68 constructed identically to end caps 8 in FIGS. 1 and 2 except that primary bore 70 has a reduced diameter so as to accommodate the increased media thickness. As will be seen, no modifications to the mounting stool or head 24 are necessary.

For clarity in comparing the embodiments of the invention shown in FIGS. 3, 4 and 1, 2, respectively, identical reference numerals have been utilized for all of the unchanged corresponding parts.

A modified form of end caps 8 and 68 is illustrated in FIG. 5. This end cap 72 comprises a skirt 74 having an inwardly tapered inner surface 76, again terminating in a circular edge 78 lying in a single plane. In all other respects, end cap 72 is identical to end caps 8 and 68, with the exception of the diameter of the primary bore 80, which may be modified depending on the amount of filter media used.

As mentioned earlier, alternative configurations for gaskets 54 are permissible within the scope of the present invention, and it is only necessary to modify the shape of the lower portion of the end cap skirt. Furthermore, the present invention is not limited to the particular filter or coalescer structures or to the particular mounting stool design shown in the drawings.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A coalescer or filter end cap comprising: a disc-like base portion having an upper surface adapted for supporting filter or coalescing media, said base portion having a peripheral edge and an opening extending therethrough, said opening being spaced radially inwardly of said peripheral edge, a skirt connected to said base portion on the opposite side thereof relative to said upper surface, said skirt extending generally downwardly away from said base portion and terminating in a lower surface, said skirt including a peripheral outer surface having a diameter smaller than the diameter of the peripheral edge of said base portion, an inner surface opposite said outer peripheral surface defining a counterbore having a diameter larger than the diameter of said opening, said skirt being generally cylindrical and the lower surface thereof lying in a single plane, and an annular U-shaped gasket means having a sealing surface for sealing against a mounting stool or the like having a non-recessed sealing surface with a predetermined radial width substantially greater than the sealing surface of the gasket means so as to enable the gasket means sealing surface to seat against any portion of the entire sealing surface of the stool without the necessity for the gasket means to be tightly received in a recess in the stool surface, said gasket means being made of a resilient material having a bottom portion including said gasket sealing surface and including an opposite surface that overlies the skirt lower surface and sides extending upwardly along and overlying the skirt inner surface and peripheral outer surface, respectively said gasket means being adapted to seal against the flow of liquid beneath the skirt lower surface when the gasket bottom portion is compressed between the skirt lower surface and the mounting stool, or the like.

2. The end cap of claim 1 wherein said skirt is integral with said base portion.

3. The end cap of claim 1 wherein said base portion includes an annular upstanding peripheral edge.

4. The end cap of claim 1 wherein said opening is circular, and including at least one of filter media and coalescing media supported on said base portion upper surface, said one of filter media and coalescing media being spaced radially outward from said opening.

5. The end cap of claim 1 wherein said mounting stool sealing surface includes a small upstanding annular ridge in contact with the gasket sealing surface.

6. The end cap of claim 1 wherein said skirt inner surface is tapered.

7. The end cap of claim 1 wherein said opening is circular and coaxial with said skirt.

8. In combination: a mounting stool including a non-recessed sealing surface with a predetermined radial width; a coalescer or filter end cap comprising: a disc-like base portion having an upper surface adapted for supporting filter or coalescing media, said base portion having a peripheral edge and an opening extending therethrough, said opening being spaced radially inwardly of said peripheral edge, a skirt connected to said base portion on the opposite side thereof relative to said upper surface, said skirt extending generally downwardly away from said base portion and terminating in a lower surface, said skirt including a peripheral outer surface having a diameter smaller than the diameter of the peripheral edge of said base portion, an inner surface opposite said outer peripheral surface defining a counterbore having a diameter larger than the diameter of said opening, said skirt being generally cylindrical and the outer surface thereof lying in a single plane, and an annular U-shaped gasket means having a sealing surface for sealing against the mounting stool sealing surface, wherein the mounting stool sealing surface has a predetermined radial width substantially greater than the sealing surface of the gasket means so as to enable the gasket means sealing surface to seat against any portion of the entire sealing surface of the stool without the necessity for the gasket means to be tightly received in a recess in the stool surface, said gasket means being made of a resilient material having a bottom portion including said gasket sealing surface and including an opposite surface that overlies the skirt lower surface and sides extending upwardly along and overlying the skirt inner surface and peripheral outer surface, respectively, said gasket means bottom portion being compressed between the skirt lower surface and the mounting stool sealing surface; and one of coalescing and filter media supported on said base portion upper surface.

* * * * *